United States Patent
Beaudry et al.

(10) Patent No.: US 10,427,952 B2
(45) Date of Patent: Oct. 1, 2019

(54) WATER TREATMENT SYSTEM WITH PASSIVE HALOGEN BARRIER

(71) Applicant: Hamilton Sundstrand Corporation, Charlotte, NC (US)

(72) Inventors: Aaron Beaudry, Houston, TX (US); Barbara M. Peyton, Windsor, CT (US); John W. Steele, New Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 295 days.

(21) Appl. No.: 15/629,790

(22) Filed: Jun. 22, 2017

(65) Prior Publication Data
US 2018/0370820 A1    Dec. 27, 2018

(51) Int. Cl.
*C02F 1/00* (2006.01)
*C02F 1/28* (2006.01)
*C02F 1/42* (2006.01)
*C02F 1/50* (2006.01)
*C02F 1/68* (2006.01)
(Continued)

(52) U.S. Cl.
CPC .............. *C02F 1/285* (2013.01); *C02F 1/001* (2013.01); *C02F 1/28* (2013.01); *C02F 1/286* (2013.01); *C02F 1/42* (2013.01); *C02F 1/50* (2013.01); *C02F 1/683* (2013.01); *C02F 1/766* (2013.01); *C02F 1/00* (2013.01); *C02F 1/281* (2013.01); *C02F 1/283* (2013.01); *C02F 1/685* (2013.01); *C02F 1/76* (2013.01); *C02F 2001/422* (2013.01); *C02F 2103/06* (2013.01); *C02F 2201/001* (2013.01); *C02F 2201/006* (2013.01); *C02F 2201/008* (2013.01); *C02F 2303/04* (2013.01); *C02F 2303/185* (2013.01); *C02F 2305/08* (2013.01)

(58) Field of Classification Search
CPC .... C02F 1/00; C02F 1/001; C02F 1/28; C02F 1/281; C02F 1/283; C02F 1/285; C02F 1/286; C02F 1/42; C02F 1/50; C02F 1/683; C02F 1/685; C02F 1/76; C02F 1/766; C02F 2001/422; C02F 2103/06; C02F 2201/001; C02F 2201/006; C02F 2201/008; C02F 2303/04; C02F 2303/185; C02F 2305/08
See application file for complete search history.

(56) References Cited

U.S. PATENT DOCUMENTS

| | | | |
|---|---|---|---|
| 8,425,771 | B2 | 4/2013 | O'Brien et al. |
| 8,980,097 | B2 | 3/2015 | Theivendran et al. |

(Continued)

FOREIGN PATENT DOCUMENTS

| | | |
|---|---|---|
| EP | 2664588 A1 | 11/2013 |
| WO | 9933539 A1 | 7/1999 |
| WO | 2006021966 A1 | 3/2006 |

OTHER PUBLICATIONS

Partial European Search Report for European Application No. 18179264.9, dated Nov. 2, 2018.

(Continued)

*Primary Examiner* — Lucas A Stelling
(74) *Attorney, Agent, or Firm* — Carlson, Gaskey & Olds, P.C.

(57) ABSTRACT

A water treatment system includes an adsorbent bed, a halogen-release material downstream of, and adjacent to, the adsorbent bed, and a passive halogen barrier intermediate of the adsorbent bed and the halogen-release material.

8 Claims, 2 Drawing Sheets

(51) Int. Cl.
*C02F 1/76* (2006.01)
*C02F 103/06* (2006.01)

(56) References Cited

U.S. PATENT DOCUMENTS

2004/0238440 A1 12/2004 Clendenning
2008/0011662 A1 1/2008 Milosavljevic

OTHER PUBLICATIONS

European Search Report for European Patent Application No. 18179264.9 completed Oct. 18, 2018.

WATER TREATMENT SYSTEM WITH PASSIVE HALOGEN BARRIER

BACKGROUND

The International Space Station, spacesuits such as the Extravehicular Mobility Unit, spacecraft, or other space structures that operate in outer space include systems that use water. Depending on the system, the water may come into contact with heat exchangers, pumps, valves, sublimators, circulation circuits in astronaut garments, and other components.

Typically the water is filtered and treated to remove contaminants and destroy micro-organisms that could otherwise foul the components and debit performance. If the filters and water treatments do not perform at expected levels or are compromised in some way, the levels of contaminants or micro-organisms may increase and, if untreated, lead to fouling. While some components are returned from space and restored at regular intervals, premature fouling may require early return, which greatly increases costs.

SUMMARY

A water treatment system according to an example of the present disclosure includes an adsorbent bed, a halogen-release material downstream of, and adjacent to, the adsorbent bed, and a passive halogen barrier intermediate the adsorbent bed and the halogen-release material.

In a further embodiment of any of the foregoing embodiments, the passive halogen barrier is a pleated sheet.

In a further embodiment of any of the foregoing embodiments, the pleated sheet is formed of polyolefin.

In a further embodiment of any of the foregoing embodiments, the passive halogen barrier is contiguous with the adsorbent bed.

In a further embodiment of any of the foregoing embodiments, rein the passive halogen barrier is contiguous with the halogen-release material.

A further embodiment of any of the foregoing embodiments includes a common canister that has an inlet and an outlet, and the adsorbent bed, the passive halogen barrier, and the halogen-release material are within the common canister intermediate the inlet and the outlet.

In a further embodiment of any of the foregoing embodiments, adsorbent bed is in a first cartridge and the halogen-release material is in second, separate cartridge.

In a further embodiment of any of the foregoing embodiments, adsorbent bed, the passive halogen barrier, and the halogen-release material are in a common cartridge.

In a further embodiment of any of the foregoing embodiments, the adsorbent bed includes at least one of activated carbon media, synthetic carbon, or zeolite, and the halogen-release material includes iodinated resin.

In a further embodiment of any of the foregoing embodiments, the passive halogen barrier is a pleated sheet formed of either polypropylene or polyethylene, and the pleated sheet is contiguous with at least one of the adsorbent bed or the halogen-release material.

A further embodiment of any of the foregoing embodiments includes a spacesuit, and the adsorbent bed, the halogen-release material, and the passive halogen barrier are within the spacesuit.

A water treatment system according to an example of the present disclosure includes a space structure that has a water line and a heat source connected with the water line for conveying water through the heat source to regulate temperature, and a sublimator connected with the water line to receive the water. The sublimator has a porous plate, an adsorbent bed disposed in the water line, a halogen-release material disposed in the water line downstream of, and adjacent to, the adsorbent bed, and a passive halogen barrier disposed in the water line intermediate the adsorbent bed and the halogen-release material.

In a further embodiment of any of the foregoing embodiments, the space structure is a spacesuit.

In a further embodiment of any of the foregoing embodiments, the heat source is a garment.

In a further embodiment of any of the foregoing embodiments, the water line is a recirculation loop between the sublimator and the heat source.

In a further embodiment of any of the foregoing embodiments, the passive hydrogen barrier is a pleated sheet.

In a further embodiment of any of the foregoing embodiments, the pleated sheet is formed of polyolefin.

In a further embodiment of any of the foregoing embodiments, the pleated sheet is contiguous with at least one of the adsorbent bed or the halogen-release material.

A further embodiment of any of the foregoing embodiments includes a common canister having an inlet and an outlet, and the adsorbent bed, the passive halogen barrier, and the halogen-release material are within the common canister intermediate the inlet and the outlet.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
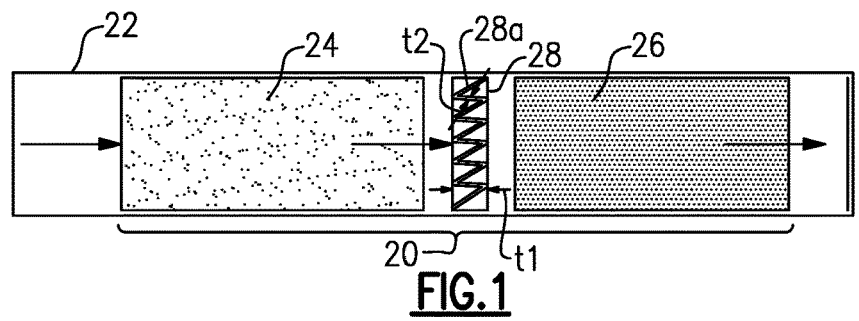
FIG. 1 illustrates an example water treatment system that includes an adsorbent bed, a halogen-release material, and a passive halogen barrier.

FIG. 1 schematically illustrates an example water treatment system 20 ("system 20"). As shown, the system 20 is disposed in a water line 22. The water line 22 may be located in a space structure or a terrestrial structure. As will be described, the system 20 serves to remove contaminants from the water and to release a halogen into the water as a biocide.

The system 20 includes an adsorbent bed 24 and a halogen-release material 26 located downstream of, and adjacent to, the adsorbent bed 24. The term "adjacent" indicates that the location of the halogen-release material 26 is in the vicinity of the adsorbent bed 24. Although not limited, the vicinity of the adsorbent bed 24 may be the region within about twenty lengths of the adsorbent bed 24. More typically, the vicinity will be within ten lengths, within five lengths, or within one length. Closer proximity between the adsorbent bed 24 and the halogen-release material 26 yield a more compact system 20 that can be packaged as a unit.

The adsorbent bed 24 contains an adsorbent media, such as but not limited to, activated carbon, synthetic carbon, and zeolite. Synthetic carbon is carbon that is prepared by high temperature processing of carbon-containing starting materials, which may be natural or synthetic. Zeolites are microporous aluminosilicate materials. Most typically, the activated carbon is in the form of granules and the activated carbon is configured to remove target contaminants such as organic compounds. Halgon is added to the water as a biocide. The halogen can be depleted during use of the system due to capture in filters or adsorbent. The halogen-release material 26 serves to replenish the halogen by releasing halogen into the water. The halogen-release material 26 to may be, but is not limited to, an iodinated resin. Other or additional halogen-release materials may include halogen crystals, halogen compounds, or halogen mixtures with other materials. As will be appreciated, this list is not exhaustive and any halogen-release material that is capable of releasing halogen into a water flow-by could be used.

It has been found that under some conditions adsorbent beds or media are incompatible with halogen-release material. Put another way, there can be interactions that degrade performance. For instance, in a stagnant water environment where the release material is in the vicinity of the adsorbent, the halogen from the release material can diffuse through the stagnant water to the adsorbent. The potential for the halogen to reach the adsorbent increases the closer the release material is to the adsorbent. The adsorbent may adsorb the halogen. The adsorbed halogen irreversibly binds to an adsorption site that would otherwise be available for adsorption of target contaminants. Thus, the adsorbed halogen reduces the capacity of the adsorbent to remove target contaminants. After a period of water stagnation, such as during inactivity or storage of a system, the adsorbent may then not perform to the expected level. In a system in outer space, such a debit to performance could be especially problematic and costly.

To reduce or eliminate the effects of this diffusion phenomenon, the system 20 disclosed herein includes a passive halogen barrier 28 intermediate of the adsorbent bed 24 and the halogen-release material 26. The passive halogen barrier 28 is water-permeable and thus only minimally restricts water flow through the system 20. The term "passive" means that the barrier 28 does not consume power to function. The passive halogen barrier 28 is configured to block or remove halogens from the halogen-release material 26 that would otherwise diffuse back into the adsorbent bed 24 in a stagnant water condition. Thus, the passive halogen barrier 28 can be used instead of implementing more costly and space-consuming alternatives, such as disconnecting an adsorbent bed from a halogen-release material (costly manpower) or inclusion of a valve between the bed and release material.

As an example, the passive halogen barrier 28 is an enhanced surface area polyolefin sheet, designated at 28a. As an example, the sheet 28a is pleated or has other features that increase surface area in comparison to a flat sheet. For instance, the polyolefin of the polyolefin sheet 28a is formed of polypropylene, polyethylene, or combinations thereof. In particular, polyolefin such as polyethylene and polypropylene is effective for removing halogen, such as iodine, from water by binding with the iodine. Moreover, if pleated, the pleats of the polyolefin sheet 28a provide a barrier thickness, designated at t1, that is greater than the thickness of the sheet 28a itself, shown at t2. In some examples, t1 is greater than t2 by at least 10%, at least 25%, or at least 50%. The barrier thickness provided by the pleats provides a higher surface area (in comparison to the flat sheet) through which the halogen would have to diffuse to reach the adsorbent bed 24. Even though there is the barrier thickness, the system 20 can still be compact in comparison to alternative solutions of disconnections or valves. Especially in an outer space structure, compactness is highly desirable.

Figure 2:
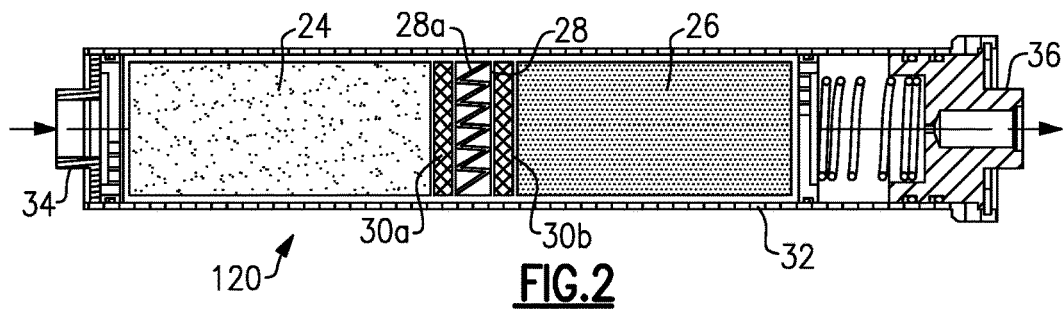
FIG. 2 illustrates an adsorbent bed, a halogen-release material, and a passive halogen barrier in a common canister.

In the system 20, the halogen-release material 26 is spaced apart from the adsorbent bed 24, and the passive halogen barrier 28 is spaced apart from both the adsorbent bed 24 and the halogen-release material 26. Although compact, FIG. 2 shows another example water treatment system 120 that is even more compact. In this example, the passive halogen barrier 28 is contiguous with the adsorbent bed 24 and also contiguous with the halogen-release material 26. That is, the passive halogen barrier 28 shares a common border, which here is screen 30a, with the adsorbent bed 24. The passive halogen barrier 28 also shares a common border, which here is screen 30b, with the halogen-release material 26. Although the passive halogen barrier 28 is contiguous with both the adsorbent bed 24 and the halogen-release material 26 in this example, it is to be understood that passive halogen barrier 28 could alternatively be contiguous with only one or the other of the adsorbent bed 24 and the halogen-release material 26. Being contiguous with both provides a more compact arrangement though.

In this example, the adsorbent bed 24, the halogen-release material 26, and the passive halogen barrier 28 are contained within a common housing or canister 32. The canister 32 includes an inlet or influent side 34 and an outlet or effluent side 36. A spring (not numbered) may be provided to retain and compact the adsorbent bed 24 and halogen-release material. In use, water is fed into the inlet 34 and flows through the adsorbent bed 24, the passive halogen barrier 28, and the halogen-release material 26 before exiting through the outlet 36.

Figure 3:
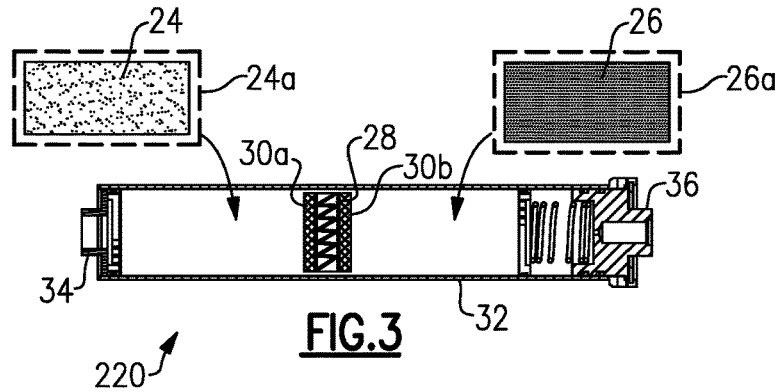
FIG. 3 illustrates another example water treatment system in which an adsorbent bed is in a first cartridge and a halogen-release material is in a second cartridge.

FIG. 3 illustrates another example water treatment system 220 that is somewhat similar to the system 120 of FIG. 2. In this example, the adsorbent bed 24 is in a first cartridge 24a and the halogen-release material 26 is in a second cartridge 26a. The cartridges 24a/26a may include, but are not limited to, a structure or lattice that supports, respectively, the adsorbent bed 24 and the halogen-release material 26 therein. The cartridges 24a/26a may further include screens and/or nets for retaining the adsorbent bed 24 and the halogen-release material 26 inside. The cartridges 24a/26a are insertable into, and removable from, the canister 32. Thus, if there is a need for replacement or regenerative treatment, one or both of the cartridges 24a/26a can be removed from the canister 32 and replaced. The separate cartridges 24a/26a also provide the benefit of being able to individually remove either of the cartridges 24a/26a without removal of the other.

Figure 4:
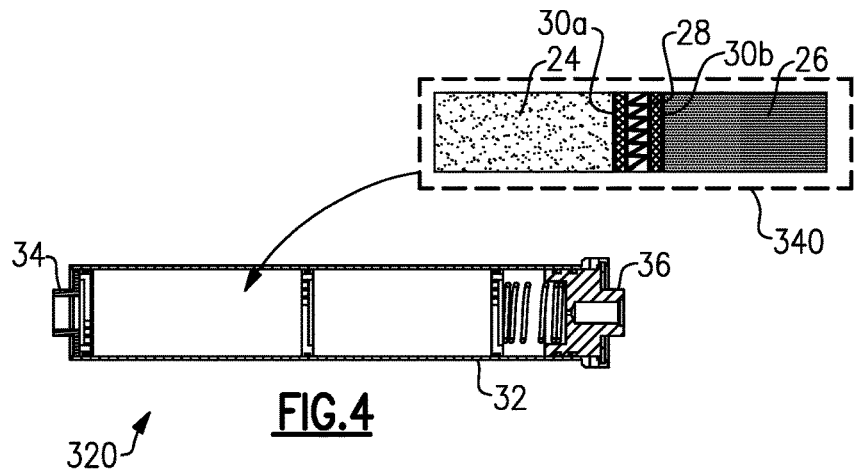
FIG. 4 illustrates another example water treatment system in which an adsorbent bed and a halogen-release material are in a common cartridge.

Alternatively, FIG. 4 shows another example water treatment system 320 in which the adsorbent bed 24 and the halogen-release material 26 are in a common cartridge 340. In this example, in addition to the adsorbent bed 24 and the halogen-release material 26, the common cartridge 340 includes the passive halogen barrier 28 and the screens 30a/30b. As with the cartridges 24a/26a, the common cartridge 340 is insertable into, and removable from, the canister 32. Thus, the cartridge 340 can also be removed and replaced.

Figure 5:
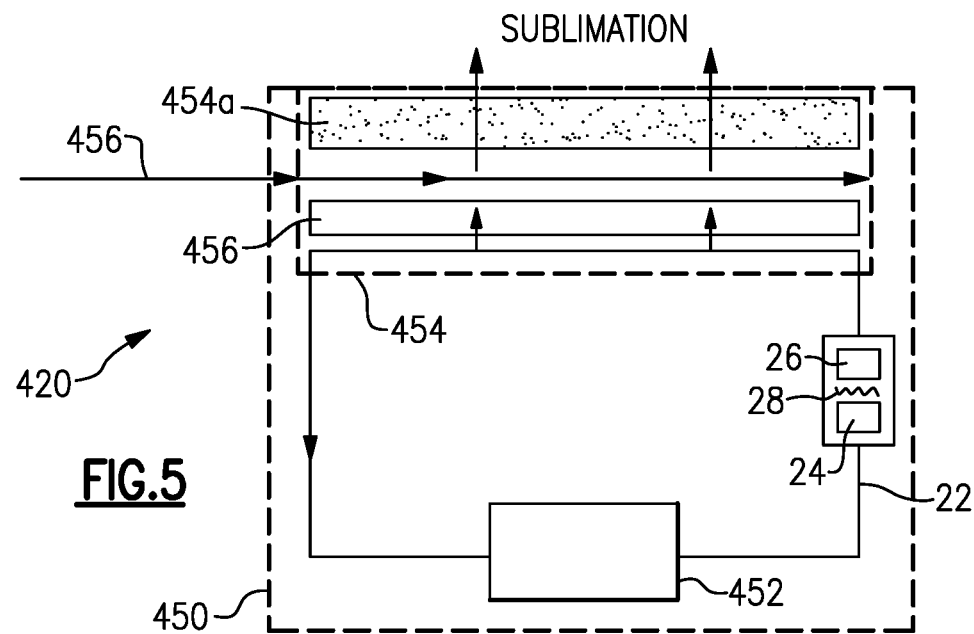
FIG. 5 illustrates a water treatment system that includes a space structure and heat source.

FIG. 5 shows another example water treatment system 420. In this example, the adsorbent bed 24, halogen-release material 26, and passive halogen barrier 28 are disposed within a space structure 450, which is here also considered to be part of the system 420. More specifically, the water line 22 in this example is a recirculation loop that runs between a heat source 452 and a sublimator 454.

The sublimator 454 generally includes a porous plate 454a that is connected with a water feed line 456. A thermal transfer member 456 is arranged adjacent the porous plate 454a. The water feed line 456 provides water to the porous plate 454a, or at least the vicinity of the porous plate 454a. The water freezes on the surface of the porous plate 454a. The opposed side of the porous plate 454a is exposed to a vacuum, which is typically the vacuum of outer space. The vacuum sublimes the frozen water, thereby removing heat.

The water in water line 22 circulates through the heat source 452, the adsorbent bed 24, the passive halogen barrier 28, and the halogen-release material 26 into the sublimator 454. The sublimator 454 removes heat from the water in water line 22 through the thermal transfer member 456. The cooled water then returns to the heat source 452.

Figure 6:
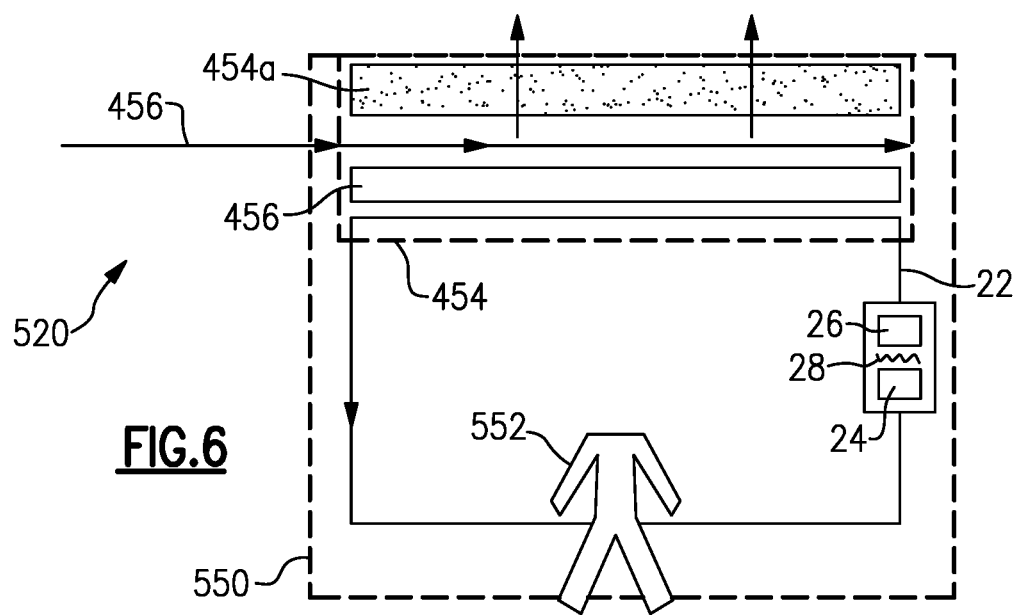
FIG. 6 illustrates another example water treatment system that includes a space suit and a garment.

FIG. 6 illustrates a modified example water treatment system 520 that is similar to system 420. In this example, the system 520 includes a space structure which is a space suit 550. The space suit 550 includes a garment 552, which is connected within the water line recirculation loop 22. The water in the water line 22 circulates through the garment 552 to regulate the temperature of the astronaut wearing the garment. As discussed above, heat is removed from the circulating water by way of the sublimator 454. One example of the spacesuit 550 is the Extravehicular Mobility Unit, which includes an outer garment, also known as a Thermal Micro-meteoroid Garment, a portable life support system, and a pressure garment. The pressure garment provides, among other things, thermal management of the astronaut wearing the spacesuit. This pressure garment may be the garment 552 connected in the water line 22.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A water treatment system comprising:
   a space structure including,
   a water line and a heat source connected with the water line for conveying water through the heat source to regulate temperature,
   a sublimator connected with the water line to receive the water, the sublimator having a porous plate,
   an adsorbent bed disposed in the water line,
   a halogen-release material disposed in the water line downstream of, and adjacent to, the adsorbent bed, and
   a passive halogen barrier disposed in the water line intermediate the adsorbent bed and the halogen-release material.

2. The water treatment system as recited in claim 1, wherein the space structure is a spacesuit.

3. The water treatment system as recited in claim 2, wherein the heat source is a garment.

4. The water treatment system as recited in claim 1, wherein the water line is a recirculation loop between the sublimator and the heat source.

5. The water treatment system as recited in claim 1, wherein the passive halogen barrier is a pleated sheet.

6. The water treatment system as recited in claim 5, wherein the pleated sheet is formed of polyolefin.

7. The water treatment system as recited in claim 6, wherein the pleated sheet shares a common border screen with at least one of the adsorbent bed or the halogen-release material.

8. The water treatment system as recited in claim 1, further comprising a common canister having an inlet and an outlet, and the adsorbent bed, the passive halogen barrier, and the halogen-release material are within the common canister intermediate the inlet and the outlet.

\* \* \* \* \*